United States Patent
Capano

(10) Patent No.: US 6,761,067 B1
(45) Date of Patent: Jul. 13, 2004

(54) SCANNING CAPACITIVE ARRAY SENSOR AND METHOD

(75) Inventor: David Capano, Greenfield, NY (US)

(73) Assignee: Environment One Corporation, Niskayuna, NY (US)

( * ) Notice: Subject to any disclaimer, the term of this patent is extended or adjusted under 35 U.S.C. 154(b) by 0 days.

(21) Appl. No.: 10/170,831

(22) Filed: Jun. 13, 2002

(51) Int. Cl.[7] ............................................. G01F 23/26
(52) U.S. Cl. ..................... 73/304 C; 340/620
(58) Field of Search .................. 73/304 C; 340/620

(56) References Cited

U.S. PATENT DOCUMENTS

| | | | | |
|---|---|---|---|---|
| 3,935,739 A | * | 2/1976 | Ells ........................ | 73/304 C |
| 4,121,094 A | | 10/1978 | DiVito et al. ............... | 235/92 |
| 4,350,040 A | * | 9/1982 | Fasching et al. ........... | 73/304 C |
| 4,512,067 A | * | 4/1985 | Kobayashi ................. | 29/25.41 |
| 4,519,012 A | * | 5/1985 | Kobayashi .................. | 361/284 |
| 4,601,201 A | * | 7/1986 | Oota et al. ................ | 73/304 C |
| 4,603,581 A | | 8/1986 | Yamanoue et al. ......... | 73/304 C |
| 4,864,857 A | * | 9/1989 | Koon ........................ | 73/304 C |
| 4,987,776 A | | 1/1991 | Koon ........................ | 73/304 C |
| 5,051,921 A | | 9/1991 | Paglione ..................... | 364/509 |
| 5,063,778 A | | 11/1991 | Jorritsma .................... | 73/299 |
| 5,103,368 A | | 4/1992 | Hart ........................... | 361/284 |
| 5,142,909 A | * | 9/1992 | Baughman ................. | 73/304 C |
| RE34,731 E | | 9/1994 | Lee et al. ................... | 73/304 C |
| 5,399,979 A | | 3/1995 | Henderson et al. ......... | 324/677 |
| 5,406,843 A | | 4/1995 | Hannan et al. .............. | 73/304 C |
| 5,437,184 A | | 8/1995 | Shillady .................... | 73/304 C |
| 5,613,399 A | | 3/1997 | Hannan et al. ............. | 73/304 C |
| 5,722,290 A | * | 3/1998 | Kronberg .................. | 73/304 C |
| 5,747,689 A | | 5/1998 | Hampo et al. ............. | 73/304 C |
| 5,757,197 A | | 5/1998 | O'Neill ...................... | 324/696 |
| 6,016,697 A | | 1/2000 | McCulloch et al. ....... | 73/304 C |
| 6,073,488 A | * | 6/2000 | Byatt et al. ............... | 73/304 C |
| 6,101,873 A | | 8/2000 | Kawakatsu et al. ....... | 73/304 C |
| 6,318,172 B1 | * | 11/2001 | Byatt et al. ............... | 73/304 C |
| 6,343,752 B1 | | 2/2002 | Sleasman et al. ............ | 241/21 |
| 6,420,882 B1 | * | 7/2002 | Engebretsen et al. ....... | 324/667 |
| 6,443,006 B1 | * | 9/2002 | Degrave .................... | 73/304 C |

FOREIGN PATENT DOCUMENTS

GB      2 354 585 A      3/2001

* cited by examiner

Primary Examiner—Hezron Williams
Assistant Examiner—Katina Wilson
(74) Attorney, Agent, or Firm—Heslin Rothenberg Farley & Mesiti P.C.

(57) ABSTRACT

A sensor for use in determining a level of a medium or detecting an object includes a plurality of spaced-apart electrically conductive members disposed on a nonconductive support. Each of the conductive members are connected to an astable multivibrator for selectively generating a first plurality of signals each having a frequency based on a capacitive value due to a respective conductive member, an at least one ground member, and at least one of an absence of the medium and a presence of the medium. A microcontroller enables determining the level of the medium or detection of the object based on the frequencies of the first plurality of generated signals. The microcontroller may be configured for compensating for buildup of a material on the sensor to enhance the accuracy of the sensor. Self-correcting features and safety features employed in the sensor are also disclosed.

50 Claims, 12 Drawing Sheets

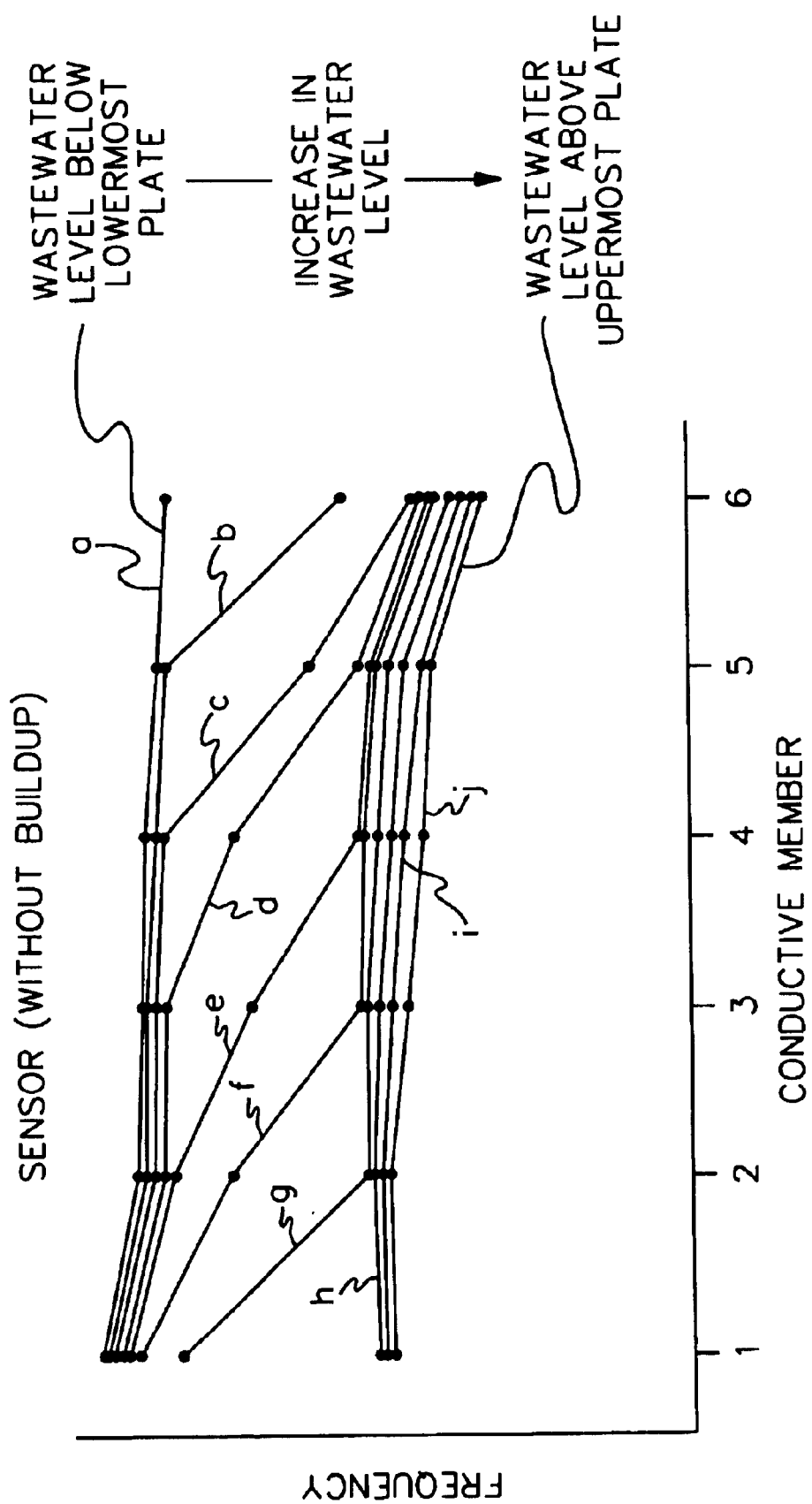

SCANNING CAPACITIVE ARRAY SENSOR AND METHOD

FIELD OF THE INVENTION

The present invention relates generally to sensors, and more particularly to sensors for detecting and measuring a medium.

BACKGROUND OF THE INVENTION

Grinder pumps are often used in low pressure sewage systems for pumping sewage. The grinder pumps include a grinder mechanism for cutting or grinding solids or semi-solid matter in the sewage being pumped. Grinding solids and/or semisolid matter in the sewage allows the resulting particulate effluent to be transferred using a pump through small diameter pipes without clogging.

Grinder pump systems are typically equipped with level sensors and an alarm. When the sewage reaches a certain level in the tank, the pump automatically switches on and when the sewage in the tank falls below a certain level, the pump automatically turns off. If the level rises too high, typically another sensor activates an alarm.

Conventional level sensors include, for example, mechanical float switches, sensing tubes connected to a pressure transducer, ultrasonic transducers, and capacitive level sensors.

One type of capacitive level sensor detects capacitance changes by means of vertical electrodes, one of which may be a continuous probe, and the other, a separate grounded probe or the grounded conductive wall of the tank containing the medium. With this type of capacitive level sensor, the absolute capacitance of the sensor is measured. The capacitance of the sensor is approximately proportional to the level of the medium in the tank. A drawback with this type of sensor is that the sensor is dependent upon the type of medium being measured. This is a problem when measuring the level of mediums having different dielectric constants and/or when the medium's dielectric constant varies over time.

Another capacitive level sensor includes a plurality of conductive plates, along with a separate grounded probe or the grounded conductive wall of the tank containing the medium. Each of the conductive plates allows generating a voltage corresponding to the capacitance of the conductive plates and the medium disposed therebetween. A problem with capacitive level sensors is that a buildup of material on the sensor can affect the accuracy of the sensor in measuring the level of the medium.

There is a need for further capacitive sensors for detecting a medium, measuring a level of a medium, and measuring a level of the medium where there is a buildup on the sensor.

SUMMARY OF THE INVENTION

The present invention provides, in a first aspect, a sensor for use in determining a level of a medium. The sensor includes a first plurality of spaced-apart electrically conductive members disposed on a nonconductive support. Means are provided for selectively generating a first plurality of signals each having a frequency based on a capacitive value due to a respective conductive member of the first plurality of conductive members, an at least one ground member, and at least one of an absence of the medium and a presence of the medium. Means are also provided for enabling determination of the level of the medium based on frequencies of the first plurality of signals.

The present invention provides, in a second aspect, a sensor for use in determining a level of a medium. The sensor includes a first plurality of spaced-apart electrically conductive members disposed on a nonconductive support. Means are provided for enabling determination of the level of the medium based on capacitive values due to respective conductive members of the first plurality of conductive members, an at least one ground member, and at least one of an absence of the medium and a presence of the medium. The means for enabling determination of the level of the medium also includes means for compensating for buildup of a material on the sensor.

The present invention provides, in a third aspect, a sensor for use in determining a level of a medium. The sensor includes a first plurality of spaced-apart electrically conductive members disposed on a nonconductive support. The first plurality of conductive members are spaced-apart a first distance therebetween. A second plurality of conductive members is disposed on the nonconductive support, and the second plurality of conductive members is spaced from the first plurality of conductive members a second distance which is different from the first distance. First means is provided for enabling determination of the level of the medium based on capacitive values due to respective conductive members of the first plurality of conductive members, an at least one ground member, and at least one of an absence of the medium and a presence of the medium. In addition, second means enable determination of at least one of the presence of the medium and the level of the medium based on capacitive values due to respective conductive members of the second plurality of conductive members, the at least one ground, and at least one of an absence of the medium and a presence of the medium. Means for generating an alarm signal is provided based on the second means for enabling determination of the at least one of the presence of the medium and the level of the medium.

The present invention provides, in a fourth aspect, a sensor for use in detecting an object. The sensor includes a first plurality of spaced-apart electrically conductive members disposed on a nonconductive support. First means are provided for generating a first plurality of signals each having a frequency based on a capacitive value due to a respective conductive member of the first plurality of conductive members, an at least one ground member, and at least one of an absence of the object and a presence of the object. First means are also provided for enabling detection of the object based on frequencies of the first plurality of signals.

Methods for measuring a level of a medium and detecting an object are also disclosed.

BRIEF DESCRIPTION OF THE DRAWINGS

The subject matter which is regarded as the invention is particularly pointed out and distinctly claimed in the concluding portion of the specification. The invention, however, may be understood by reference to the following detailed description of the following embodiments and the accompanying drawings in which:

FIG. 5 is a plot of the various conductive members along the X-axis and the frequency of the output signal along a Y-axis for a sensor (not having a buildup) for a series of measurements in which the level of a medium varies from below the lowermost conductive member to above the uppermost conductive member;

DETAILED DESCRIPTION OF THE INVENTION

Figure 1:
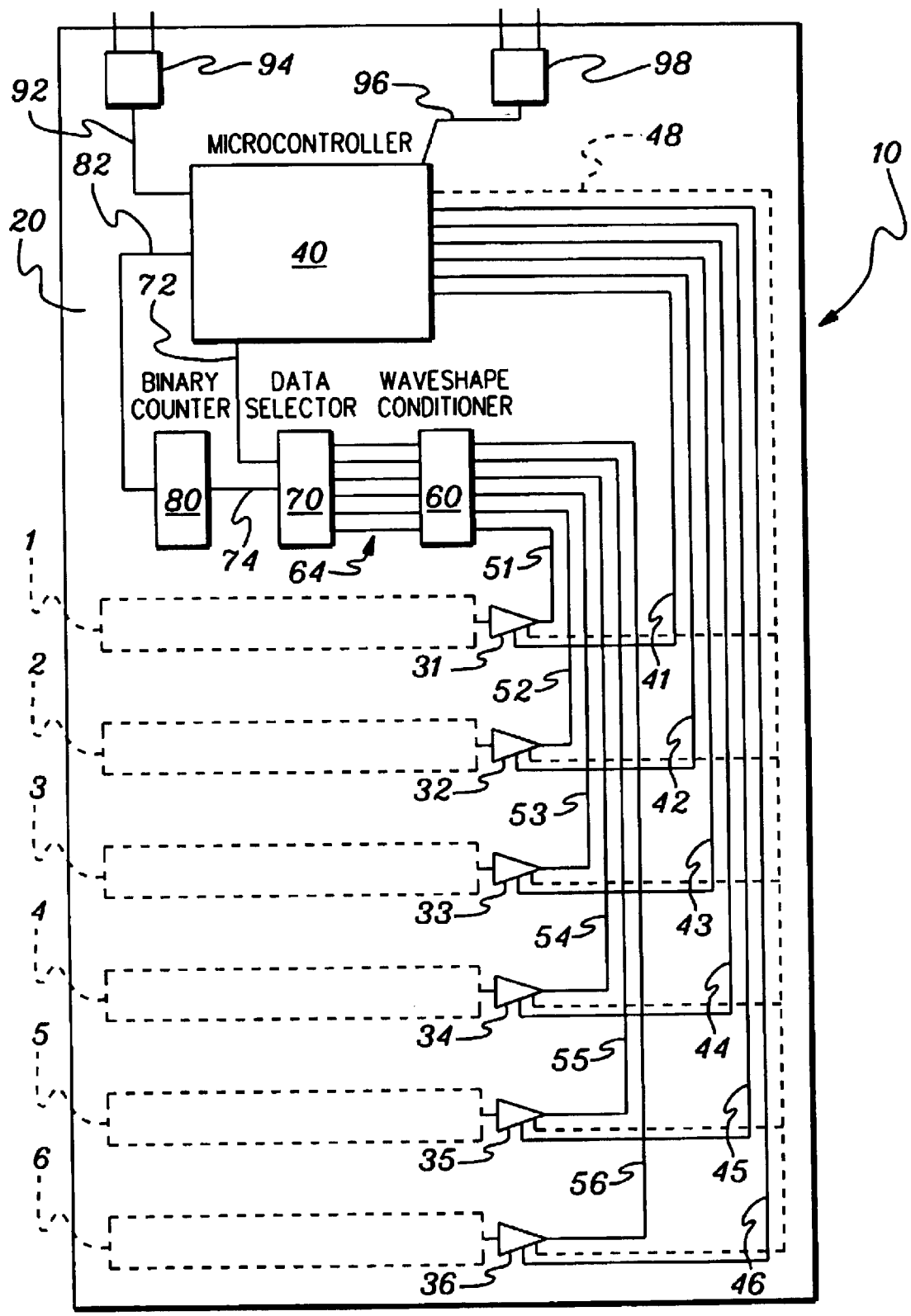
FIG. 1 is a side elevational view of one embodiment of a scanning capacitive array sensor in accordance with the present invention.

FIG. 1 illustrates one embodiment of a scanning capacitive array sensor 10 in accordance with the present invention. The scanning capacitive array sensor employs the principle of capacitance for use in determining the level of a medium and/or for use turning on and off, for example, a pump in a wastewater system. As explained in greater detail below, measurement errors caused by effluent buildup (e.g., grease buildup), and random conductivity changes (e.g., due to impurities) common in a wastewater environment, may be substantially removed by acquiring and combining the capacitive contributions from an array of capacitance conductive members in such a manner to provide a self-correcting, two-dimensional image of the shape of the effluent buildup on or in the vicinity of the sensor.

Benefits of the scanning capacitive array sensor of the present invention may include reducing the need for maintenance service and/or extending the time between maintenance services in the case where grease buildup on the sensor adversely affects the operation of the wastewater system. In addition, other benefits of the sensor may include providing a low-voltage, self-contained sensor which is not affected by air or the harsh environment in the wastewater system, as compared to pressure sensors or differential pressure sensor switches which require air pressure in a sensing bell. Further, the sensor is also not affected by atmospheric pressure changes as are pressure sensors or differential pressure sensor switches.

In this illustrative embodiment, sensor 10 generally includes a plurality of vertically spaced-apart electrically conductive plates or conductive members such as conductive members 1, 2, 3, 4, 5, and 6 (shown in dashed lines) which are mounted on a rear side of a nonconductive support 20. For example, the conductive members may be formed by etched copper lands on a printed circuit board. As illustrated in FIG. 1, the plurality of conductive members may include six elongated vertically aligned conductive members which extend across a portion of the width of the support. It is appreciated that other conductive member configurations may be equally suitable.

Figure 2:
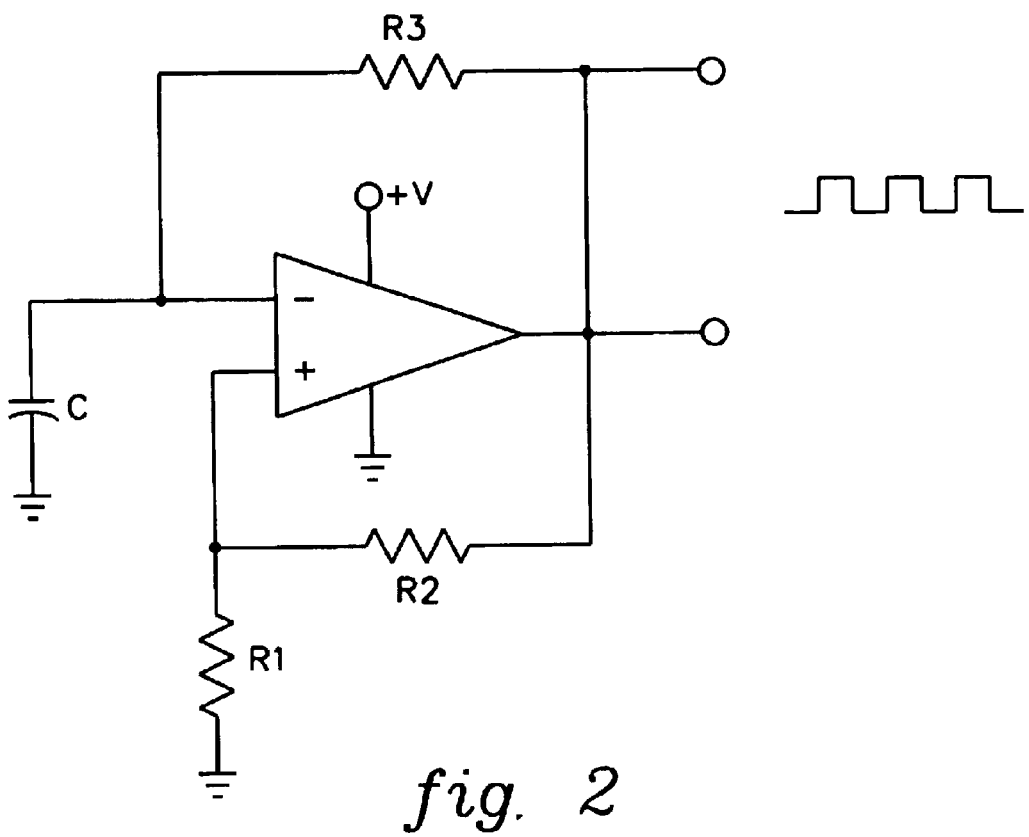
FIG. 2 is a schematic diagram of one of the amplifiers connected to a respective conductive member for producing a generally square wave output.

Each conductive member is connected via a conductor to a respective amplifier such as amplifiers 31, 32, 33, 34, 35, and 36. The amplifiers may include a high frequency video operational amplifier in a configuration known as an astable multivibrator. A microprocessor or microcontroller 40 is connected via a conductor such as conductors 41, 42, 43, 44, 45, and 46 to each respective amplifiers. A ground conductor or member 48 (shown in dashed lines) is disposed on the opposite side of the conductive member and also connects microcontroller 40 to each of the amplifiers. It will be appreciated that each of the amplifiers may have FIG. 2 illustrates an example of a schematic diagram of one of the amplifiers for producing a generally square wave output signal. The combination of one of the conductive member and the ground member acts as a capacitor C connected to the amplifier.

The frequency of the square wave output signal is roughly inversely proportional to the capacitance applied to each of the amplifiers. The capacitance applied to the amplifier varies depending on whether a conductive member and the ground member are in the medium or in the air, i.e., the capacitance is dependent on both the dielectric constant and of the media layer thicknesses disposed in front of the conductive member.

Generally, a capacitor may be formed by two parallel conductive members, each with an area A, and separated by a distance d with an insulating material disposed therebetween having dielectric constant K. The capacitance C may be represented as follows:

$$C = (KA)d.$$

Air, for example, has a K value of approximately 1, while water has a K value of approximately 84.

With reference again to FIG. 1, the output of each amplifier is connected via respective conductor such as conductors 51, 52, 53, 54, 55, and 56 to a waveshape conditioning circuit 60 also known as a Schmitt trigger. This circuit "cleans up" the waveshape to provide a cleaner square wave signal, e.g., having a more clearly defined configuration for use in the following circuitry.

Under the control of microcontroller 40 via one or more conductors such as a conductor 72, any of the conditioned output signals from the amplifiers can be selected by data selector 70 via one of a plurality of conductors 64. Data selector 70 is, in turn, connected via a conductor 74 to a binary counter 80. In binary counter 80, the square wave signal is "counted down" to a frequency whose period can be accurately measured (with a resolution of 0.5 microsecond) and a signal is transferred to microcontroller 40 via conductor 82. The oscillation of each capacitively coupled amplifier can be selectively gated on or off by the microcontroller by strobing the amplifier with a strobe signal via conductors 41, 42, 43, 44, 45, and 46.

A suitable amplifier is manufactured by and available from Analog Devices, Inc., model number AD8063; a suitable microcontroller is manufactured by and available from Motorola Corp., model number MC86HC705C8A; a suitable waveshape conditioner is manufactured by and available from Texas Instruments Corp., model number 74HC14; a suitable data selector is manufactured by and available from Texas Instruments Corp., model number 74HC151; and a suitable binary counter is manufactured by and available from Texas Instruments Corp., model number 74HC4020.

Microcontroller 40 may be connected via a conductor 92 to a digital to analog converter 94 which provides two output terminals for reading a voltage corresponding to the level of the medium. For example, the voltage output may be connected to a display. Microcontroller 40 may also be connected via a conductor 96 to solid state relay 98 for controlling, for example, a pump of a wastewater system. In addition, the microcontroller may be programmed to provide a threshold signal or signals when the level of the medium reaches an upper level and/or a lower level for turning on and off the pump. Alternatively, the voltage readout from digital to analog converter may be provided to the controller of, for example, a wastewater system, which controller uses the voltage reading for determining whether to turn on or off a pump.

Sensor 10 may be sealably disposed within a thin walled protective sleeve or suitable housing made of a low dielectric material (e.g., a PVC and all other suitable material having a dielectric constant under 6.0). Alternatively, the sensor may be provided with a suitable coating to seal the components from the medium.

Figure 3:
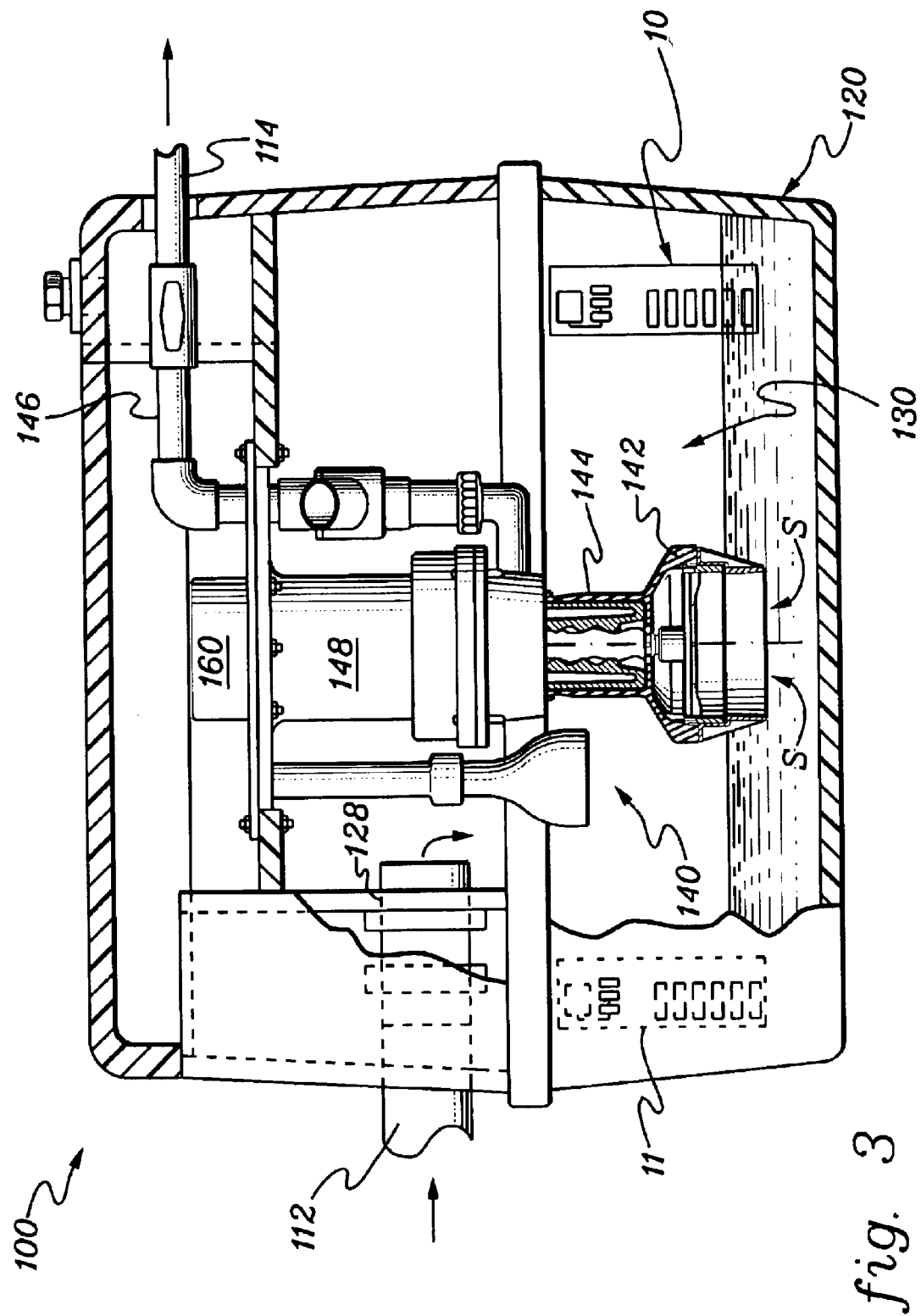
FIG. 3 is a side elevational view of the scanning capacitive array sensor installed in a grinder pump system (shown in solid lines) and alternatively outside the tank of the grinder pump system (shown in dashed lines) for determining the level of wastewater in the grinder pump system.

For illustrative purposes as shown in FIG. 3, for example, sensor 10 may be placed in an indoor wastewater disposal system 100 such as that described in U.S. Pat. No. 6,343,752 to Sleasman, et al., the entire contents of which are incorporated herein by reference, for measuring and monitoring the level of the wastewater in the system. The topmost conductive member of sensor 10 may be generally positioned so that it is constantly maintained in the air (e.g., the wastewater level is maintained below the topmost conductive member when the grinder pump system is in normal operation) while the lowermost conductive member may be positioned so that it is constantly maintained in the medium (e.g., the wastewater level is maintained above the lowermost portion of the grinder mechanism when the grinder pump system is in normal operation).

As shown in FIG. 3, system 100 generally includes a tank 120, a grinder pump 140, and an alarm unit 160 for monitoring the operation of system 100. Tank 120 defines a generally sealable chamber 130 therein for receiving wastewater from a building. Tank 120 also includes an inlet 128 attachable to a feed wastewater pipe 112 in the building. Alternatively, the sensor may be placed outside the tank of the grinder pump system such as a sensor 11 shown in dashed lines, i.e., the sensor is effective through the wall of the tank.

Grinder pump 140 includes a grinder mechanism 142 for pulverizing solids or semisolid matter in the wastewater, a pump assembly 144 attached to grinder mechanism 142 for pumping ground wastewater through grinder pump 140, and a motor (not shown). For example, a grinder mechanism may include a stationary outer ring and a rotating cutting blade, and a pump assembly may include a progressing cavity pump having a pump housing, a pump stator, and a pump rotor.

A motor housing casting 148 houses the electric motor (not shown) for powering both grinder mechanism 142 and pump assembly 144. A suitable motor is an electrical motor desirably rated at about one horsepower, 1,725 rpm, and having high torque and a capacitor starting mechanism.

Grinder pump 140 includes a pipe 146, which is connected to wastewater discharge pipe 114. In operation, wastewater is drawn into grinder mechanism 142, as illustrated by the curved arrows S in FIG. 3, for cutting or grinding of the solids or semisolid matter in the wastewater. The resulting processed particulate effluent passes through pump assembly 144, pipe 146, and then wastewater discharge pipe 114.

It will be appreciated by those skilled in the art that other suitable tanks, grinder pumps, grinding mechanisms and pump assemblies may be employed for treating wastewater and used with the scanning capacitive array sensor in accordance with the present invention.

In operation of the sensor, as described above, the microcontroller gates each of the amplifiers on, and then off, e.g., the microcontroller sends a signal via conductors 41–46 (FIG. 1) to power up the amplifier, in a sequential manner. The scanning begins at the topmost conductive member, then the next lowest, and so forth until the bottommost conductive member. Each of the amplifiers are gated in about 25 thousandths of a second so that all of the conductive members are scanned in less that about ¼ second. In this way, the capacitive contribution of each conductive member is acquired in isolation, free of interfering coupling effects from adjacent conductive members.

Where the wastewater comprises primarily water (e.g., having a generally constant dielectric constant), for each conductive member immersed in the water such as conductive members 4, 5, and 6 (FIG. 1), the response of each respective amplifier, due to its respective conductive member's capacitive loading, results in a signal having a frequency of about 1 MHz. For each conductive member disposed in the air such as conductive members 1, 2, and 3 (FIG. 1), the response of each respective amplifier, due to its respective conductive member's capacitive loading, results in a signal having a frequency of about 4 MHz.

Figure 4:
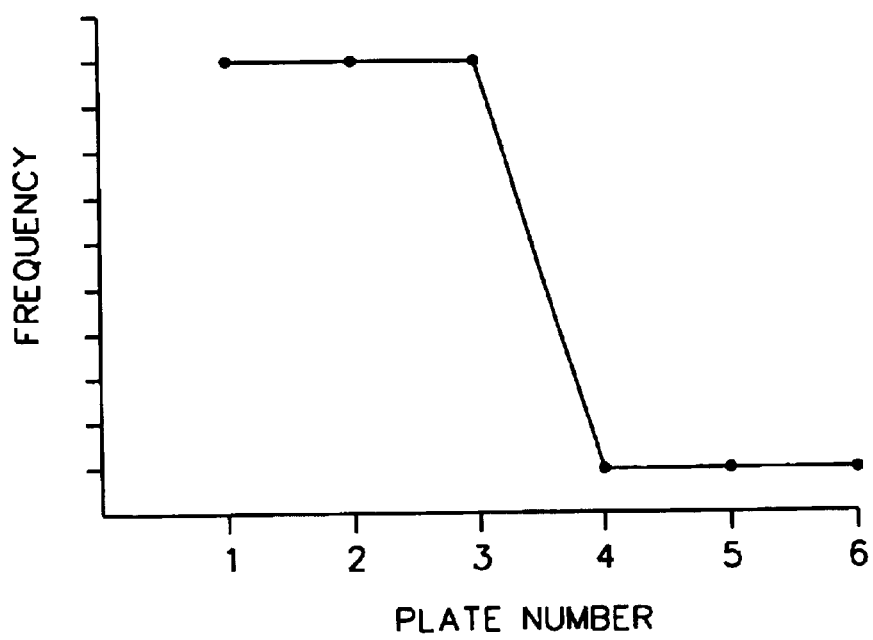
FIG. 4 is a plot of the various conductive members on the X-axis and the frequency of the output signal along a Y-axis for a medium at a level between the third conductive member and the fourth conductive member.

FIG. 4 illustrates a plot of the various conductive members along the X-axis and the frequency of the output signal from the amplifier measured by the microcontroller along a Y-axis. In this illustrated example, the wastewater level is between the third conductive member and the fourth conductive member.

FIG. 5 is a plot of the various conductive members along the X-axis and the frequency of the output signal from the amplifier measured by the microcontroller along a Y-axis for an uncoated or bare sensor, e.g., not having grease accumulated thereon, for a series of measurements (series a, b, c, d, e, f, g h, i, and j) corresponding to the wastewater lever rising from below the lowermost conductive member (series a) to above the uppermost conductive member (series j). As the wastewater level rises, the capacitance value in connection with each conductive member increases, which causes the output signal to have a lower frequency. Thus, as shown in FIG. 5, as the wastewater level rises from the lowermost conductive member (series a) to the uppermost conductive member (series j) there is a shifting from high frequencies to lower frequencies between an upper generally constant high frequency value to a parallel lower generally constant frequency value.

In addition, it is observed in FIG. 5 that the slope of the lines based on the respective frequencies between adjacent conductive members initially starts out horizontal. The slope of the line then rotates clockwise, then rotates counterclockwise as the water rises. This change in slope or change between the resulting frequencies based on adjacent conductive members (i.e., "saturation effect") may be used in programming of the microcontroller to provide set points for turning on and off the pump as described in greater detail below.

Although a plurality of discrete conductive members constitutes the sensing element in this sensor, it is found that the level of the medium can be measured in a continuous linear manner by adding the frequency contributions of the individual conductive members in the following way. If P represents a proportionality constant, $f_i$, (i=1 to n), the frequency response of the with conductive members, and $f_0$ a constant derivable from the design values of components chosen for the operational amplifiers, then for n conductive members, the level L may be given by a level function as follows:

$$L = P\left\{(n-1)f_0 - \left[\frac{f_1 - f_n}{2}\right] + f_2 + \ldots + f_{n-1}\right\}$$

Figure 6:
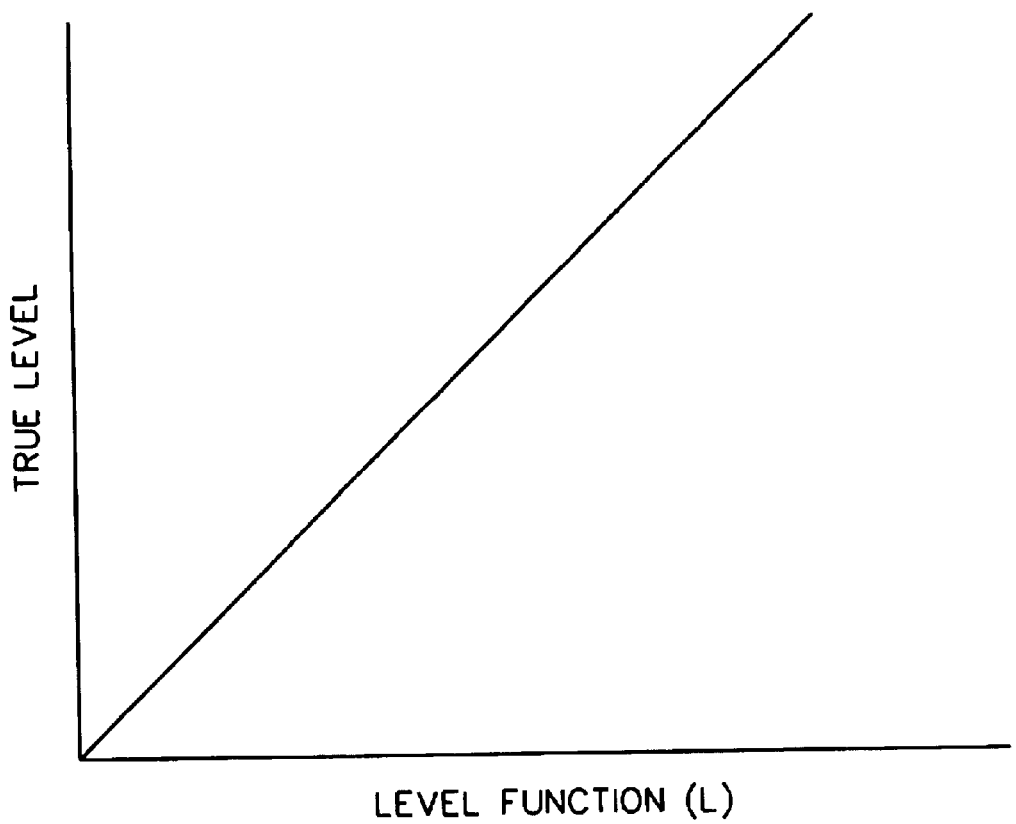
FIG. 6 is a plot of the medium's true level vs. its level as determined mathematically by a level function.

FIG. 6 is a plot of the true level of a medium vs. its level as calculated by the level function.

Figure 7:
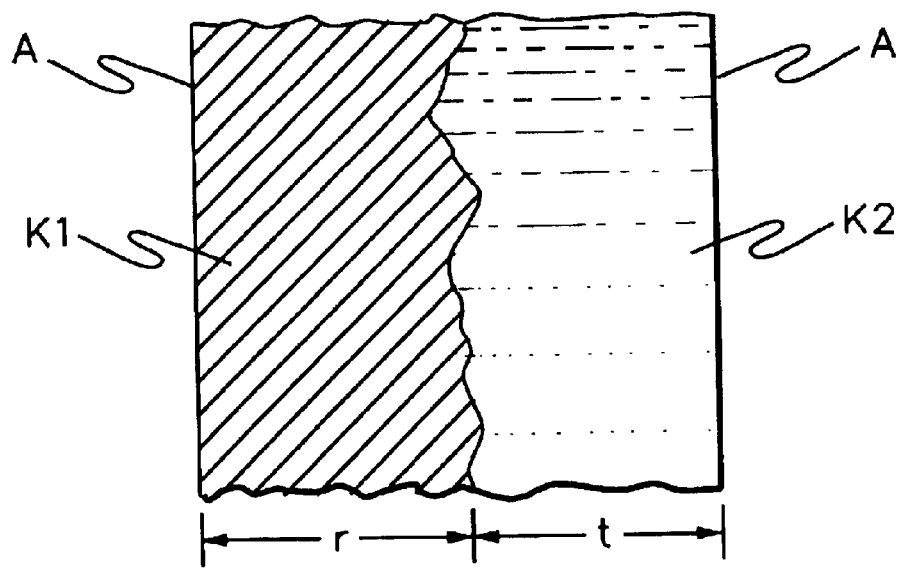
FIG. 7 is a diagrammatic illustration of a capacitor formed by two parallel conductive members having a layer of grease and a medium disposed therebetween.

FIG. 7 illustrates a diagram of a capacitor formed by two parallel conductive members, each with an area A, and filled by two dielectric layers. The first layer is characterized thickness r and dielectric constant $K_1$, and the second layer is characterized by thickness t and dielectric constant $K_2$ (e.g., a thin first layer of grease having $K_1$=6 and an extended layer of water having $K_2$=84). Where B is a constant of proportionality, the capacitance C may be represented as follows:

$$C = B\frac{A}{\frac{r}{K_1} + \frac{t}{K_2}}$$

In addition to the frequency changes resulting from the presence of a liquid such as wastewater, due to the different dielectric constants of the wastewater grease, an amplifier may also respond to the thickness of the buildup of grease on the sensor adjacent to one or more conductive members. For example, a portion of the sensor having one inch of grease buildup results in the conductive member(s) and common ground member providing less capacitance and, therefore, a higher frequency, than those conductive members covered with two inches of grease buildup. In effect, with each scan cycle, the microcontroller constructs a numerical image, in frequency units, of the dielectric and buildup conditions in the vicinity of the conductive members. Testing has shown that capacitive effects can be observed up to a distance of four to five inches from the sensor.

Figure 8:
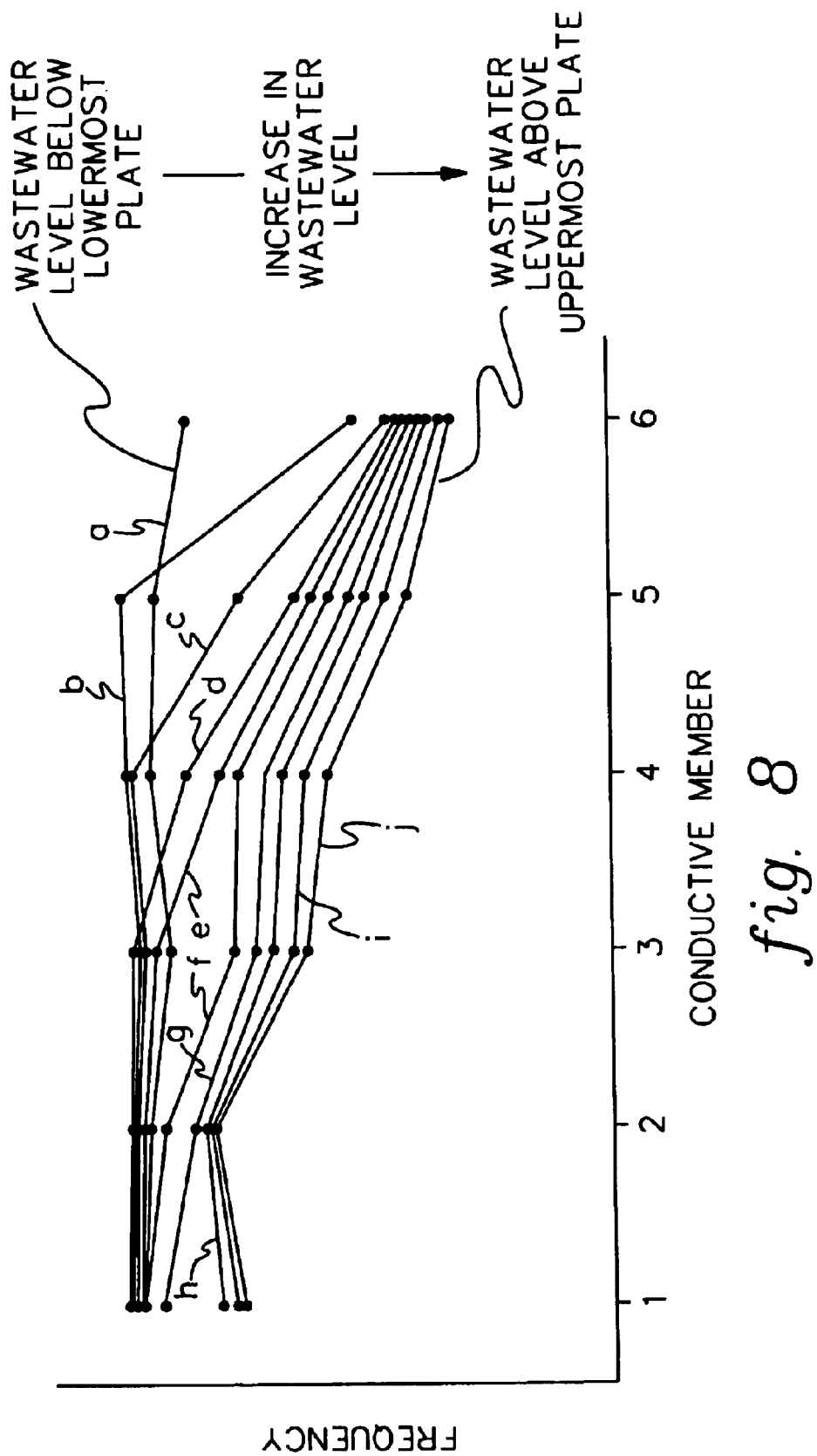
FIG. 8 is a plot of the various conductive members along the X-axis and the frequencies of the output signals along a Y-axis for a sensor having a buildup for a series of measurements in which the level of a medium varies from below the lowermost conductive member to above the uppermost conductive member.

Another aspect of the present invention provides a method for compensating for grease buildup on the sensor over time. FIG. 8 is a plot of the various conductive members along the X-axis and the frequency of the output signal from the amplifier measured by the microcontroller along a Y-axis for a coated sensor, e.g., having ½-inch of grease and twelve towels accumulated on the sensor, for a series of measurements corresponding to the wastewater lever rising from below the lowermost conductive members to above the uppermost conductive members.

As shown in FIG. 8, when the wastewater lever rises, there is a shift downward in frequency but the shift does not result in a generally constant lower frequency as was the case in FIG. 5 where the sensor did not have an accumulation of grease. That. is to say, FIGS. 8 and 7 result in plots having different geometries.

The measurement of level makes use of a "saturation effect" which takes place in each pair of adjacent conductive members when the level of the liquid component of the sewage moves past them.

For such a pair of adjacent conductive plates, if $f_1$ is the frequency of the upper conductive member and $f_2$ is the frequency of the lower conductive member, the change in the frequency difference can be defined by $f_1-f_2$ as the liquid level rises from an initial position below the lower conductive member. As the level begins to cover the lower conductive member $f_2$ will decrease rapidly due to the large increase in the lower conductive member's capacitance. However, $f_1$ will decrease slowly due to the small increase in the upper conductive member's capacitance. As the level continues to rise and begins to cover the upper conductive member, $f_2$ will now decrease more slowly because the lower conductive member capacitance has saturated, e.g., progressed beyond it's maximum change in value and, now, due to the large increase in the upper conductive member capacitance, $f_1$ will decrease rapidly. The effect on $f_{1-2}$ is to cause this difference to, first, increase, then, decrease. That is, the difference will "peak" as the level crosses the conductive members, and at a point controlled by the numerical tolerance chosen to qualify the occurrence of the peak. This effect will occur regardless of any buildup which may exist on the conductive member. This effect also permits the sensor to self-calibrate itself because the peak detections occur at, and correspond to, known conductive members elevations. Effectively, the level is determined by reference to the conductive members dimensions and inter-conductive member separations e.g., the known "geometry" of the nonconductive support 20, to ensure measurement accuracy regardless of arbitrary amounts of buildup.

To compensate for grease buildup on the sensor over time, first, electrical power is periodically supplied to the grinder pump system 100 (FIG. 3.) For example, to microcontroller 40 (and/or in combination with alarm/control unit 160) operate to turn the grinder pump on. Under the control of a failsafe timer (not shown), microcontroller 40 measures the frequencies of each of the conductive members as the sewage level decreases. When, within a given tolerance, the frequencies of the conductive members stop changing, the pump is shut off. This is the turn-off threshold. At this point, the level of the liquid sewage is below the bottommost portion of sensor 10 but above the bottom of the pump suction housing. With the liquid volume displaced, the frequencies obtained from the conductive members now reflect the varying thickness of any grease buildup and, provide a set of initial conditions used subsequently to measure the level of the liquid components of the sewage.

Second, the frequency measurements from the two topmost conductive members are continuously examined until a peak due to the wastewater covering these conductive members is detected. At this point, the grinder pump is turned on. This is the turn-on threshold.

For example, with reference to FIG. 8, this is observed in the slope of the lines between conductive members 1 and 2 as the medium level reaches the bottom of conductive member 1.

Third, the turn-off threshold (using conductive members 5 and 6) and turn-on threshold (using conductive members 1 and 2) provide a spanning coefficient to ensure range accuracy through full scale. If L is the level calculated by the level function, supra, $L_{off}$ is the turn-off threshold, $L_{on}$ is the turn-on threshold, and m is a multiplier related to the specific embodiment of the digital-to-analog converter 94 used to output the corrected level $L_{cor}$, then $$L_{cor} = m\left[\frac{L - L_{off}}{L_{on} - L_{off}}\right]$$

For a six conductive members sensor, each image is initially six levels high and provides a data set related to the thicknesses and dielectric values of the media present. The method discussed provides, during the real time acquisition of data sets, the ability to extract, in a continuous and linear manner, the level of the medium's liquid component.

Figure 9:
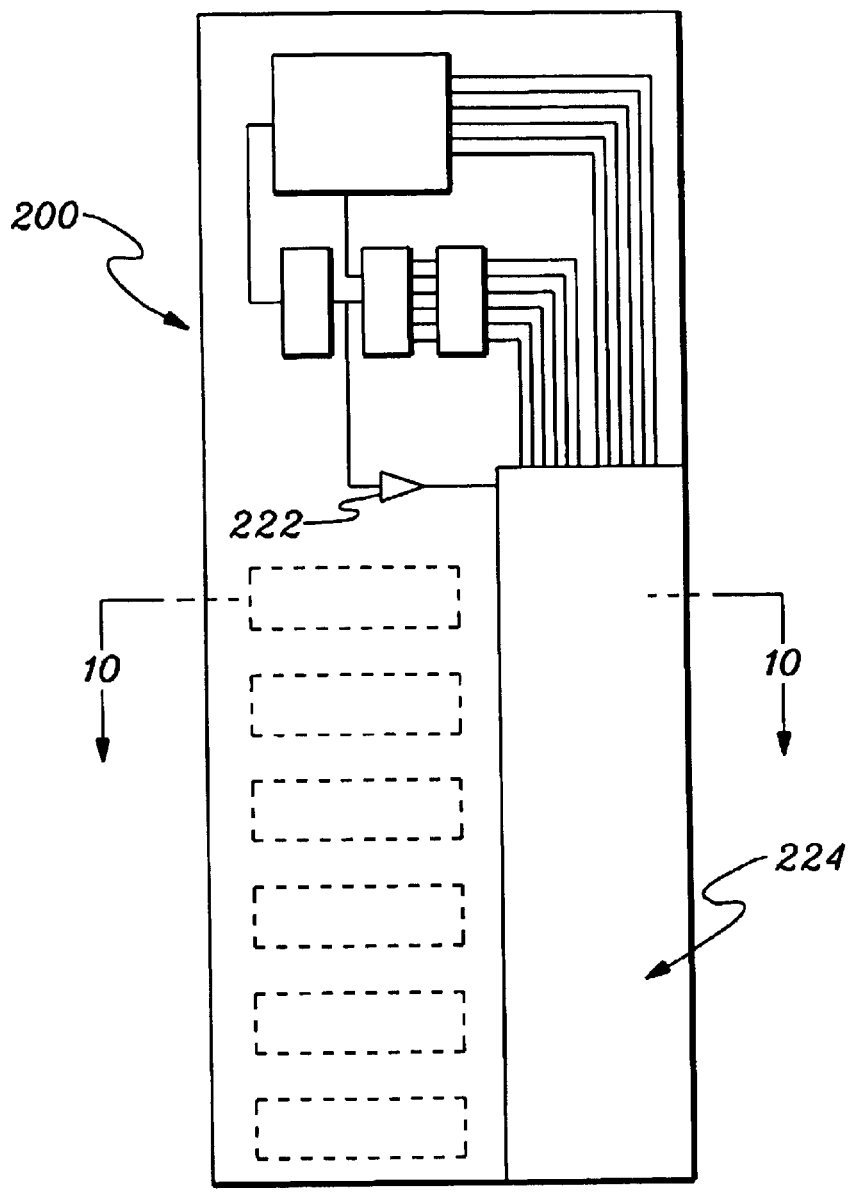
FIG. 9 is a side elevational view of another embodiment of a scanning capacitive array sensor in accordance with the present invention.
Figure 10:
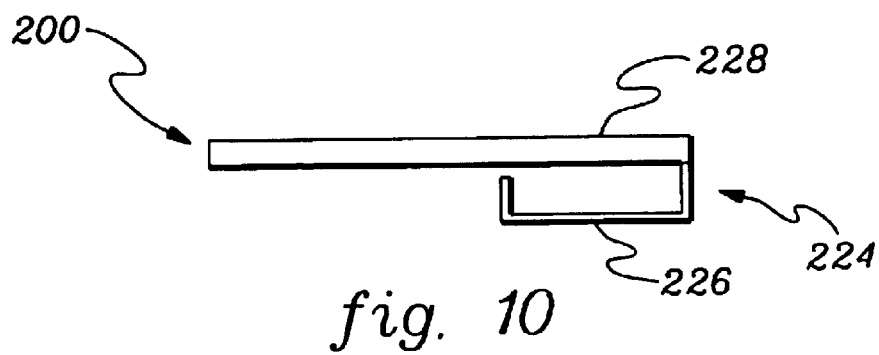
FIG. 10 is a view taken along line 10—10 in FIG. 9.

FIGS. 9 and 10 illustrate another embodiment of a capacitive array sensor 200 in accordance with the present invention. In this embodiment, an exact replica of the signal generated based on the respective active conductive member, once buffered by a guard amplifier 222, is used to drive a guard plate 224 which comprises a front conductive plate 226 electrically connected to a rear conductive plate 228. Front plate 226 may be an extruded piece of aluminum which extends over the amplifiers and conductors and rear plate 228 may be a piece of aluminum extending along the length of the rear surface of the support. By this means both the stray capacitances, as well as all grounded conductors, in the vicinity of the active plate, are effectively removed ("guarded"). This allows for a more accurate measurement of the frequencies and, more importantly, forces the active conductive members electric field to now span a substantially greater distance, e.g., from the conducting member to the equivalent ground electrode now present in the uppermost area of the printed circuit board. This set up greatly increases the measurement range of the sensor.

Figure 11:
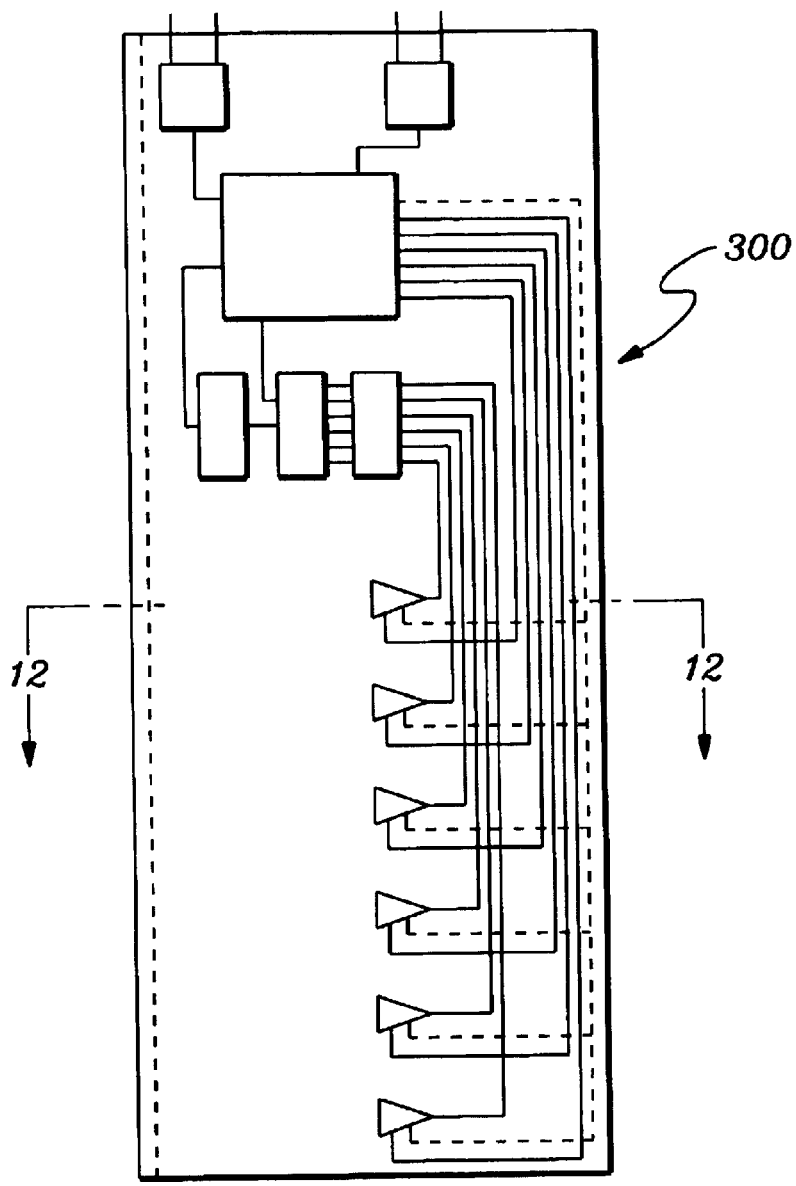
FIG. 11 is a side elevational view of another embodiment of a scanning capacitive array sensor in accordance with the present invention.
Figure 12:
FIG. 12 is a view taken along line 12—12 in FIG. 11.

FIGS. 11 and 12 illustrate another embodiment of a capacitive array sensor 300 in accordance with the present invention. In this illustrated embodiment, the conductor members are disposed on a portion of the support which is disposed perpendicular to the portion containing the amplifiers. Spacing the conductive members away from the ground member causes the electric field to span a greater distance and thereby increases the measurement range of the sensor.

Figure 13:
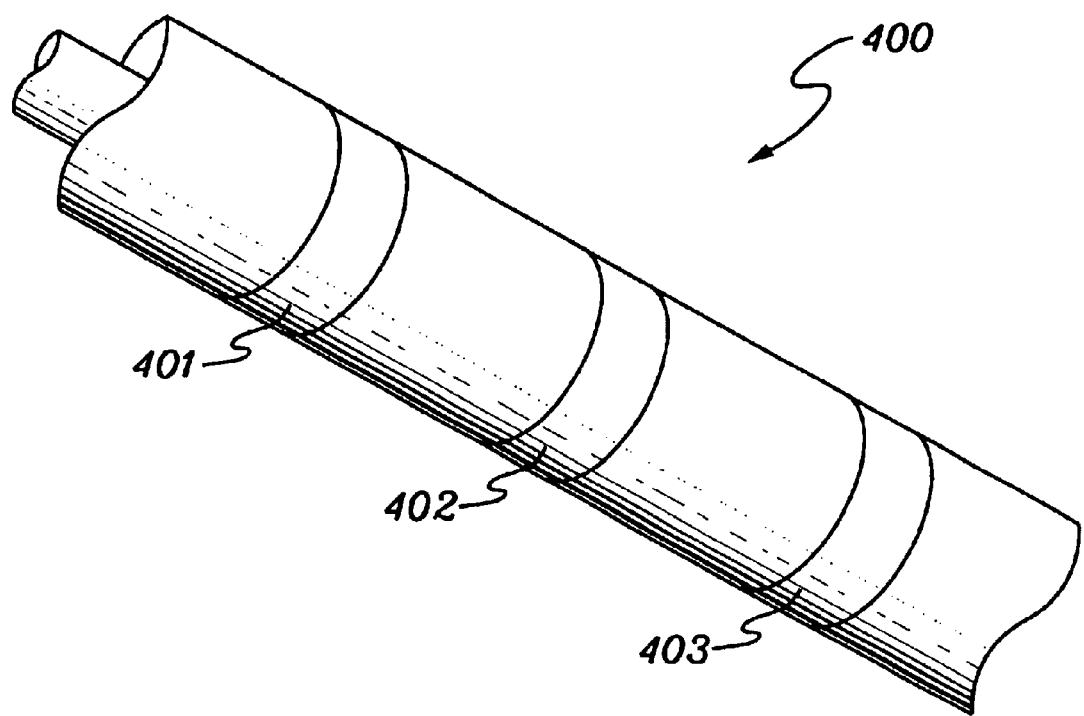
FIG. 13 is a perspective view of another embodiment of a plurality of conductive members in accordance with the present invention for a scanning capacitive array sensor.

FIG. 13 illustrates still another embodiment of the conductive members of a capacitive array sensor 400 in accordance with the present invention. As shown in FIG. 13, the conductive members, e.g., spaced-apart conductive members 401, 402, 403 have a curved shape which extend around a cylindrical surface. Conductors or wires may be provided which connect the conductive members to the electronic circuitry (not shown). The conductors may include a coaxial cable to provide shielding or the conductors may be disposed in and shielded by a conductive tube, e.g., aluminum tube. While FIG. 13 illustrates the conductive members as being rings, it will be appreciated that the conductive members for the various sensors may also include arcuately extending conductive members.

Figure 14:
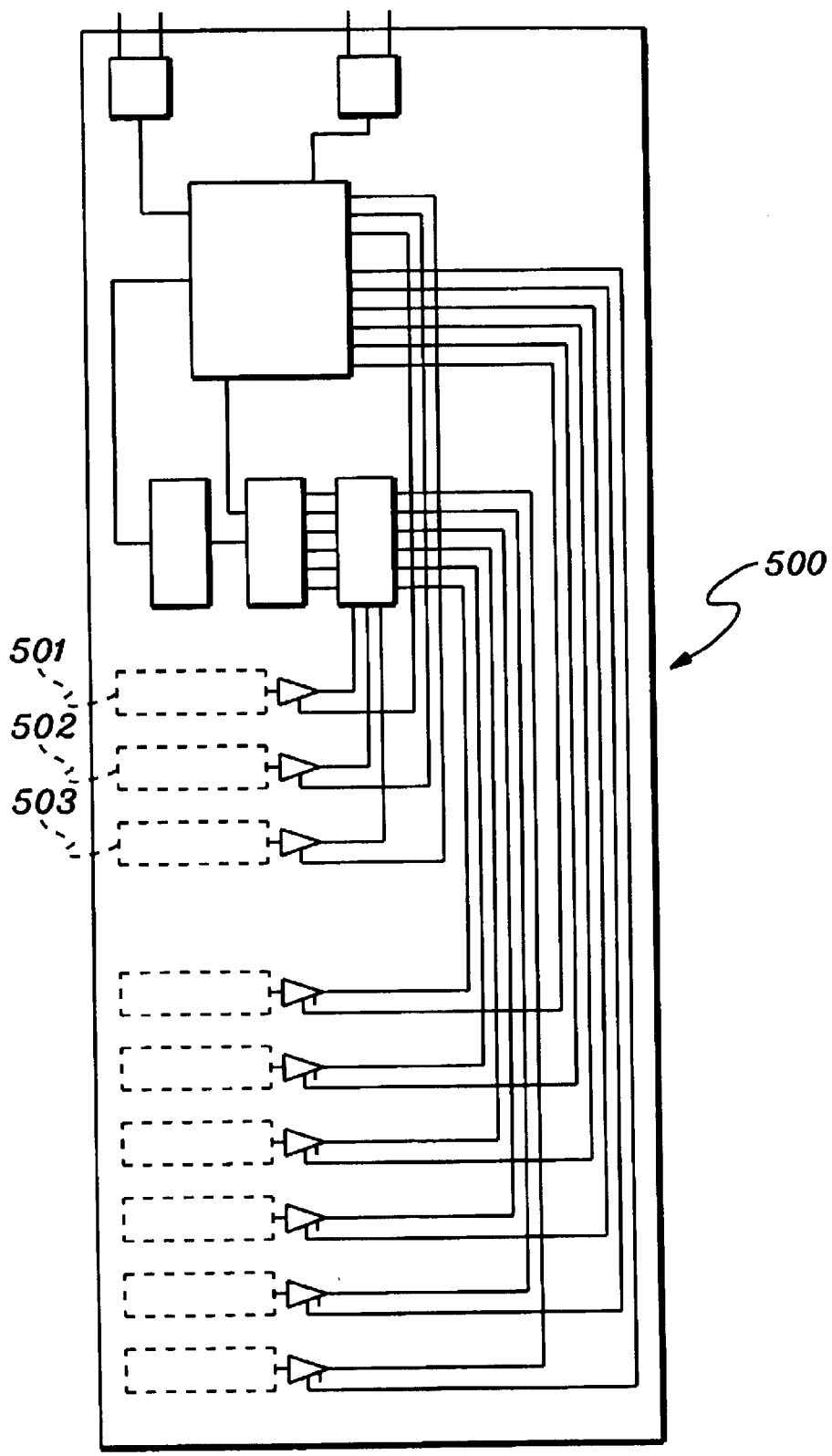
FIG. 14 is a side elevational view of another embodiment of a scanning capacitive array sensor in accordance with the present invention.

FIG. 14 illustrates another embodiment of a capacitive array sensor 500 in accordance with the present invention. In this illustrated embodiment, the upper portion of the sensor is provided with a second plurality of spaced-apart conductive members 501, 502, and 503 and respective amplifiers for use in providing an alarm. For example, three spaced-apart plates 501, 502, and 503 are spaced from a plurality of conductive members similar to the six conductive members described above in connection with the sensor for normal operation of, for example, a grinder pump, described above in connection with FIG. 1.

The upper plurality of conductive members, as shown in FIG. 14, are used for detecting a medium level for triggering an alarm. The procedure for detecting the high medium level, may be determined in the manner described above using a determination of frequencies based on the resulting capacitance using the three conductive members. The microcontroller may include suitable software programming so that if a medium level is detected at plate 502, an alarm will be triggered or a signal sent to an alarm unit.

Figure 15:
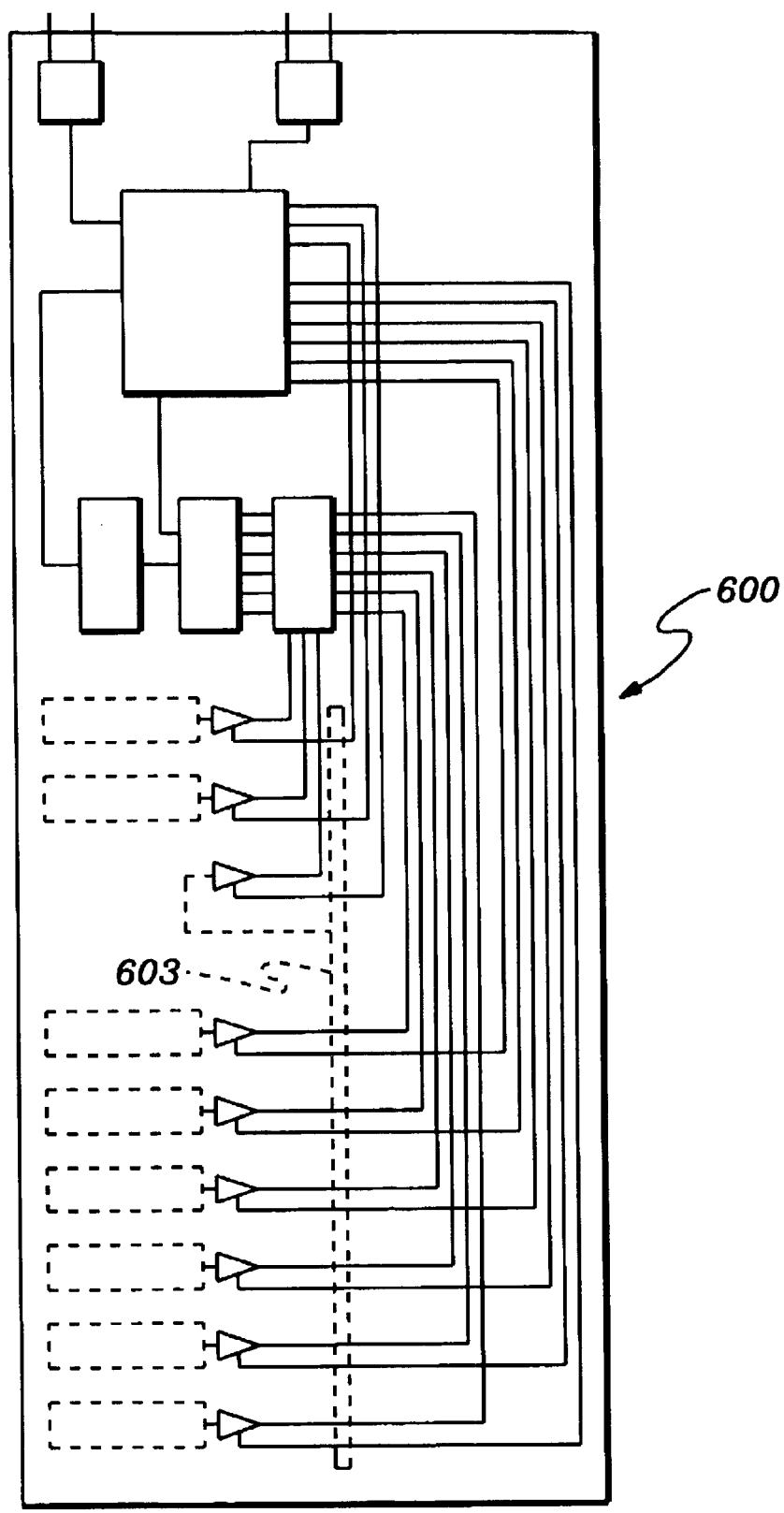
FIG. 15 is a side elevational view of still another embodiment of a scanning capacitive array sensor in accordance with the present invention.

FIG. 15 illustrates another embodiment of a capacitive array sensor 600 in accordance with the present invention. In this illustrated embodiment, one of the conductive members in the upper portion of the sensor is configured as an elongated vertical conductive member 603. Such an elongate vertical conductive member allows an additional or safety mechanism in the case of power loss. In particular, vertical plate 603 is used, during the critical power-up period (following a power outage) when the grinder pump is on, to redundantly monitor the change in level and ensure that the grinder pump is shut off when the level reaches the bottom of the bottommost conductive member.

While the above description has been directed to wastewater systems, it will be appreciated that the sensor for measuring the level of a medium may be used in other applications, e.g., measurement of dry materials such as grains or other food or manufacturing products. Other liquid type applications may include refrigerant fluids.

Figure 16:
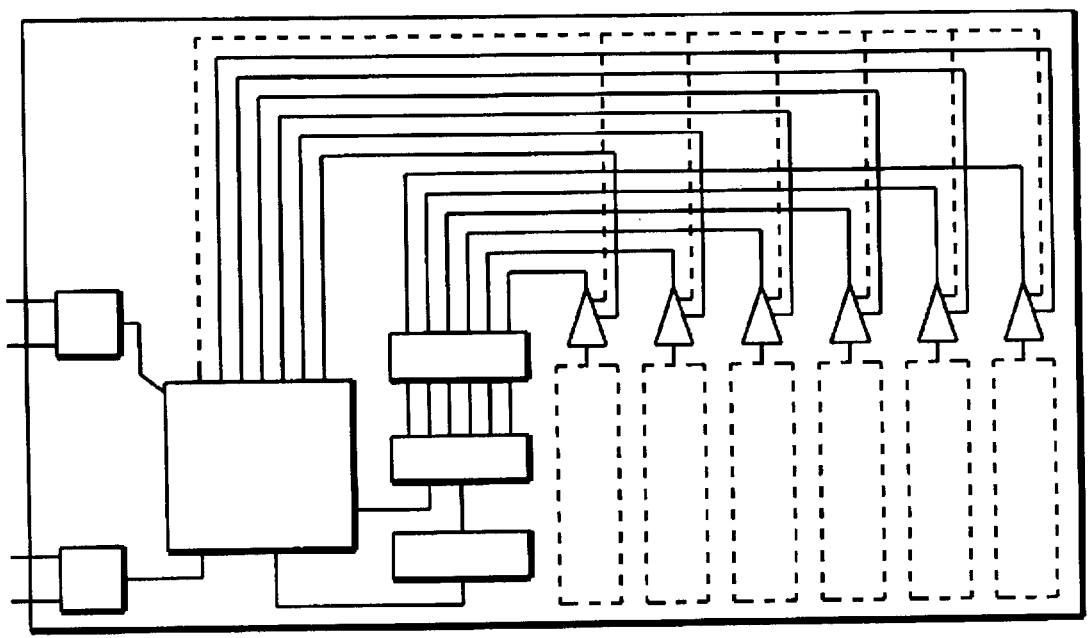
FIG. 16 is a side elevational view of yet another embodiment of scanning capacitive array sensor for detecting an object in accordance with the present invention.

The sensors may also be used for detecting the position of an object in accordance with the present invention. For example, a sensor 700 may be positioned horizontally, as shown in FIG. 16, e.g., for measurement of the object from left to right sensor 700 may be used for detecting the position, leading edge, trailing edge, or translation or movement of an object. Examples of the uses of the sensor to detect objects include detecting the location products on a conveyor belt and counting products on a processing line. In addition, the sensor may be used for placing or positioning an object at a specific location, e.g., the sensor in combination with a servo mechanism. The process for determining the level medium described above may be employed for determining the position, leading edge, or trailing edge of an object using sensor 700. In addition to either a vertical or horizontal orientation of the sensors, the sensors of the present invention may be positioned on any angle. The sensors of the present invention provides measurement of a medium or detection of an object with or without contact with the medium or object.

It will be appreciated that the sensors in accordance with the present invention may include conductive members which number more or less that the six conductive members illustrated in the drawings. In addition, the size and configuration of the conductive members, the distance between the conductive members and the ground member or members, and the shape and sizing of the housing or the coating encasing the components of the sensor may be selected to optimize the performance of the sensor.

While the invention has been described in detail herein in accordance with certain embodiments thereof, many modifications and changes therein may be effected by those skilled in the art. Accordingly, it is intended by the appended claims to cover all such modifications and changes as fall within the true spirit and scope of the invention.

What is claimed is:

1. A sensor for use in determining a level of a medium, said sensor comprising:
   a first plurality of spaced-apart electrically conductive members disposed on a nonconductive support;
   first means for generating a first plurality of signals each having a frequency derived directly from a capacitive value due to a respective conductive member of said first plurality of conductive members, an at least one ground member, and at least one of an absence of the medium and a presence of the medium; and
   first means for enabling determination of the level of the medium based on frequencies of the first plurality of signals.

2. The sensor of claim 1 wherein said first means for enabling determination comprises a counter for determining the frequencies of the signals.

3. The sensor of claim 1 wherein said first means for enabling determination comprises means for determining a level L based on the formula:

$$L \propto \left\{ (n-1)f_0 - \left[\frac{f_1 - f_n}{2}\right] + f_2 + \ldots + f_{n-1} \right\}$$

where n is the number of conductive members, $f_0$ is a constant derivable from said means for generating said first plurality of signals, and $f_i$(i=1 to n) are the frequencies of the first plurality of signals.

4. The sensor of claim 1 wherein said first means for enabling determination comprises means for compensating for buildup of a material on said sensor.

5. The sensor of claim 1 wherein said first means for enabling determination comprises means for comparing changes in frequencies between two adjacent conductive members.

6. The sensor of claim 5 wherein said means for comparing comprises means for determining a peak difference in change in frequencies between two adjacent conductive members.

7. The sensor of claim 1 further comprising means for generating a signal corresponding to a threshold level of the medium based on determining a peak difference in change in frequencies between two adjacent conductive members.

8. The sensor of claim 1 further comprising an elongated conductive member and means for determining the level of the medium based on an absolute capacitance value in connection with said elongated conductive member.

9. The sensor of claim 1 further comprising:
   a second plurality of spaced-apart electrically conductive members disposed on the nonconductive support, said second plurality of conductive members being spaced from said first plurality of conductive members;
   second means for generating a second plurality of signals each having a frequency based on a capacitive value due to a respective conductive member of said second plurality of conductive members, the at least one ground member, and at least one of an absence of the medium and a presence of the medium;
   second means for determining at least one of the presence of the medium fluid and the level of the medium based on the second plurality of signals; and
   means responsive to said second means for generating an alarm signal.

10. The sensor of claim 1 further comprising a guard for shielding at least a portion of said at least one ground member.

11. The sensor of claim 1 wherein said support comprises a first portion and a second portion perpendicular to said first portion, and wherein said first plurality of conductive members are disposed on said first portion of said nonconductive support and said at least one ground member is disposed on said second portion of said nonconductive support.

12. The sensor of claim 1 wherein said first plurality of conductive member comprises a plurality of curved-shaped conductive members.

13. A grinder pump system in combination with said sensor of claim 1.

14. A sensor for use in determining a level of a medium, said sensor comprising:
   a first plurality of spaced-apart electrically conductive members disposed on a nonconductive support;
   first means for enabling determination of the level of the medium based on capacitive values due to respective conductive members of said first plurality of conductive members, an at least one ground member, and at least one of an absence of the medium and a presence of the medium; and
   wherein said first means for enabling determination of the level of the medium comprises means for compensating for buildup of a material on said sensor.

15. The sensor of claim 14 wherein said first means for enabling determination of the level of the medium comprises first means for generating a first plurality of signals each having a frequency based on a capacitive value due to a respective conductive member of said first plurality of conductive members, the at least one ground member, and at least one of an absence of the medium and a presence of the medium, and means for determining a level L based on the formula:

$$L \propto \left\{ (n-1)f_0 - \left[\frac{f_1 - f_n}{2}\right] + f_2 + \ldots + f_{n-1} \right\}$$

where n is the number of conductive members, $f_0$ is a constant derivable from said means for generating said first plurality of signals, and $f_i$(i=1 to n) are the frequencies of the first plurality of signals.

16. The sensor of claim 15 further comprising means for generating a signal corresponding to a threshold level of the medium based on determining a peak difference in change in frequencies between two adjacent conductive members.

17. A sensor for use in determining a level of a medium, said sensor comprising:
   a first plurality of spaced-apart electrically conductive members disposed on a nonconductive support, said first plurality of conductive members being spaced-apart a first distance therebetween;
   a second plurality of electrically conductive members disposed on the nonconductive support, said second plurality of conductive members being spaced from said first plurality of conductive members a second distance which is different from said first distance;
   first means for enabling determination of the level of the medium derived directly from capacitive values due to respective conductive members of said first plurality of conductive members, an at least one ground member, and at least one of an absence of the medium and a presence of the medium;
   second means for enabling determination of at least one of the presence of the medium and the level of the medium based on capacitive values due to respective conductive members of the said second plurality of conductive members, the at least one ground member, and at least one of an absence of the medium and a presence of the medium; and means for generating an alarm signal based on said second means for enabling determination of the at least one of the presence of the medium and the level of the medium.

18. A sensor for use in detecting an object, said sensor comprising:

a first plurality of spaced-apart electrically conductive members disposed on a nonconductive support;

first means for generating a first plurality of signals each having a frequency derived directly from a capacitive value due to a respective conductive member of said first plurality of conductive members, an at least one ground member, and at least one of an absence of the object and a presence of the object; and first means for enabling detection of the object based on frequencies of the first plurality of signals.

19. The sensor of claim 18 wherein said means for determining comprises a counter for determining the frequencies of the signals.

20. The sensor of claim 18 wherein said first plurality conductive members is horizontally disposed on said nonconductive support.

21. A method for determining a level of a medium, the method comprising:

providing a first plurality of spaced-apart electrically conductive members disposed on a nonconductive support;

providing at least one ground member;

generating a first plurality of signals each having a frequency derived directly from a capacitive value due to a respective conductive member of the first plurality of conductive members, the at least one ground member, and at least one of an absence of the medium and a presence of the medium; and generating a signal enabling determination of the level of the medium based on frequencies of the first plurality of signals.

22. The method of claim 21 wherein the generating a signal enabling determination of the level of the medium comprises employing a counter for determining the frequencies of the signals.

23. The method of claim 21 wherein the generating a signal enabling determination of the level of the medium comprises determining a level L based on the formula:

$$L \propto \left\{ (n-1)f_0 - \left[\frac{f_1 - f_n}{2}\right] + f_2 + \ldots + f_{n-1} \right\}$$

where n is the number of conductive members, $f_0$ is a constant derivable from the means for generating the first plurality of signals, and $f_i$(i=1 to n) are the frequencies of the first plurality of signals.

24. The method of claim 21 wherein the generating a signal enabling determination of the level of the medium comprises compensating for buildup of a material on the sensor.

25. The method of claim 21 wherein the generating a signal enabling determination of the level of the medium comprises comparing changes in frequencies of two adjacent conductive members.

26. The method of claim 25 wherein the comparing comprises determining a peak difference in change between frequencies of two adjacent conductive members.

27. The method of claim 21 further comprising generating a signal corresponding to a threshold level of the medium based on determining a peak difference in change in frequencies between two adjacent conductive members.

28. The method of claim 21 further comprising providing an elongated conductive member and determining the level of the medium based on an absolute capacitance value in connection with the elongated conductive member.

29. The method of claim 21 further comprising:

providing a second plurality of spaced-apart electrically conductive members disposed on the nonconductive support, the second plurality of conductive members being spaced from the first plurality of conductive members;

generating a second plurality of signals each having a frequency based on a capacitive value due to a respective conductive member of the second plurality of conductive members, the at least one ground member, and at least one of an absence of the medium and a presence of the medium;

determining at least one of the presence of the medium fluid and the level of the medium based on the second plurality of signals; and generating an alarm based on the determining signal.

30. A method for operating a grinder pump system in combination with the method of claim 21.

31. A method for use in determining a level of a medium, the method comprising:

providing a first plurality of spaced-apart electrically conductive members disposed on a nonconductive support;

providing at least one ground member;

generating a signal for enabling determination of the level of the medium based on capacitive values due to a respective conductive member, the at least one ground member, and at least one of an absence of the medium and a presence of the medium; and wherein generating a signal for enabling determination of the level of the medium comprises compensating for buildup of a material on the sensor.

32. The method of claim 31 wherein the generating a signal enabling determination of the level of the medium comprises determining a level L based on the formula:

$$L \propto \left\{ (n-1)f_0 - \left[\frac{f_1 - f_n}{2}\right] + f_2 + \ldots + f_{n-1} \right\}$$

where n is the number of conductive members, $f_0$ is a constant derivable from the means for generating the first plurality of signals, and $f_i$(i=1 to n) are the frequencies of the first plurality of signals.

33. The method of claim 31 further comprising generating a signal corresponding to a threshold level of the medium based on determining a peak difference in change in frequencies between two adjacent conductive member.

34. A method for use in determining a level of a medium, the method comprising:

providing a first plurality of spaced-apart electrically conductive members disposed on a nonconductive support, the first plurality of conductive members being spaced-apart a first distance therebetween;

providing a second plurality of spaced-apart electrically conductive members disposed on the nonconductive support, the second plurality of conductive members being vertically spaced from the first plurality of conductive members a second distance which is different from the first distance;

providing at least one ground member;

generating a signal enabling determination of the level of the medium derived directly from a capacitive value due to a respective conductive member of the first plurality of conductive members, the at least one ground member, and at least one of an absence of the medium and a presence of the medium;

determining at least one of the presence of the medium and the level of the medium based on a capacitive value due to a respective conductive member of the second plurality of conductive members, the at least one ground member, and at least one of an absence of the medium and a presence of the medium; and generating an alarm signal based on the determining the at least one of the presence of the medium and the level of the medium.

35. A method for detecting an object, the method comprising:

providing a first plurality of spaced-apart electrically conductive members disposed on a nonconductive support;

providing at least one ground member;

generating a first plurality of signals each having a frequency derived directly from a capacitive value due to a respective conductive member of the first plurality of conductive members, an at least one ground member, and at least one of an absence of the object and a presence of the object; and generating a signal enabling detection of the object based on frequencies of the first plurality of signals.

36. The method of claim 35 wherein the determining comprises providing a counter for determining the frequencies of the signals.

37. The method of claim 35 wherein the providing the first plurality conductive members comprising providing a first plurality of conductive members disposed horizontally on the nonconductive support.

38. A sensor for use in determining a level of a medium, said sensor comprising:

a first plurality of spaced-apart electrically conductive members disposed on a nonconductive support;

first means for generating a first plurality of signals each having a frequency based on a capacitive value due to a respective conductive member of said first plurality of conductive members, an at least one ground member, and at least one of an absence of the medium and a presence of the medium;

first means for enabling determination of the level of the medium based on frequencies of the first plurality of signals; and wherein said first means for enabling determination comprises a counter for determining the frequencies of the signals.

39. A sensor for use in determining a level of a medium, said sensor comprising:

a first plurality of spaced-apart electrically conductive members disposed on a nonconductive support;

first means for generating a first plurality of signals each having a frequency based on a capacitive value due to a respective conductive member of said first plurality of conductive members, an at least one ground member, and at least one of an absence of the medium and a presence of the medium; first means for enabling determination of the level of the medium based on frequencies of the first plurality of signals; and wherein said first means for enabling determination comprises means for determining a level L based on the formula:

$$L \propto \left\{ (n-1)f_0 - \left[\frac{f_1 - f_n}{2}\right] + f_2 + \ldots + f_{n-1} \right\}$$

where n is the number of conductive members, $f_0$ is a constant derivable from said means for generating said first plurality of signals, and $f_i$ (i=1 to n) are the frequencies of the first plurality of signals.

40. A sensor for use in determining a level of a medium, said sensor comprising:

a first plurality of spaced-apart electrically conductive members disposed on a nonconductive support;

first means for generating a first plurality of signals each having a frequency based on a capacitive value due to a respective conductive member of said first plurality of conductive members, an at least one ground member, and at least one of an absence of the medium and a presence of the medium;

first means for enabling determination of the level of the medium based on frequencies of the first plurality of signals;

wherein said first means for enabling determination comprises means for comparing changes in frequencies between two adjacent conductive members; and wherein said means for comparing comprises means for determining a peak difference in change in frequencies between two adjacent conductive members.

41. The sensor of claim 40 further comprising means for generating a signal corresponding to a threshold level of the medium based on determining a peak difference in change in frequencies between two adjacent conductive members.

42. A sensor for use in determining a level of a medium, said sensor comprising:

a first plurality of spaced-apart electrically conductive members disposed on a nonconductive support;

first means for generating a first plurality of signals each having a frequency based on a capacitive value due to a respective conductive member of said first plurality of conductive members, an at least one ground member, and at least one of an absence of the medium and a presence of the medium;

first means for enabling determination of the level of the medium based on frequencies of the first plurality of signals; and wherein said support comprises a first portion and a second portion perpendicular to said first portion, and wherein said first plurality of conductive members are disposed on said first portion of said nonconductive support and said at least one ground member is disposed on said second portion of said nonconductive support.

43. A sensor for use in detecting an object, said sensor comprising:

a first plurality of spaced-apart electrically conductive members disposed on a nonconductive support;

first means for generating a first plurality of signals each having a frequency based on derived directly from a capacitive value due to a respective conductive member of said first plurality of conductive members, an at least one ground member, and at least one of an absence of the object and a presence of the object;

first means for enabling detection of the object based on frequencies of the first plurality of signals; and wherein said means for determining comprises a counter for determining the frequencies of the signals.

44. A sensor for use in detecting an object, said sensor comprising:
a first plurality of spaced-apart electrically conductive members disposed on a nonconductive support;
first means for generating a first plurality of signals each having a frequency based on a capacitive value due to a respective conductive member of said first plurality of conductive members, an at least one ground member, and at least one of an absence of the object and a presence of the object;
first means for enabling detection of the object based on frequencies of the first plurality of signals; and
wherein said first plurality conductive members is horizontally disposed on said nonconductive support.

45. A method for determining a level of a medium, the method comprising:
providing a first plurality of spaced-apart electrically conductive members disposed on a nonconductive support;
providing at least one ground member;
generating a first plurality of signals each having a frequency based on a capacitive value due to a respective conductive member of the first plurality of conductive members, the at least one ground member, and at least one of an absence of the medium and a presence of the medium;
generating a signal enabling determination of the level of the medium based on frequencies of the first plurality of signals; and
wherein the generating a signal enabling determination of the level of the medium comprises employing a counter for determining the frequencies of the signals.

46. A method for determining a level of a medium, the method comprising:
providing a first plurality of spaced-apart electrically conductive members disposed on a nonconductive support;
providing at least one ground member;
generating a first plurality of signals each having a frequency based on a capacitive value due to a respective conductive member of the first plurality of conductive members, the at least one ground member, and at least one of an absence of the medium and a presence of the medium;
generating a signal enabling determination of the level of the medium based on frequencies of the first plurality of signals; and
wherein the generating a signal enabling determination of the level of the medium comprises determining a level L based on the formula:

$$L \propto \left\{ (n-1)f_0 - \left[\frac{f_1 - f_n}{2}\right] + f_2 + \ldots + f_{n-1} \right\}$$

where n is the number of conductive members, $f_0$ is a constant derivable from the means for generating the first plurality of signals, and $f_i$ (i=1 to n) are the frequencies of the first plurality of signals.

47. A method for determining a level of a medium, the method comprising:
providing a first plurality of spaced-apart electrically conductive members disposed on a nonconductive support;
providing at least one ground member;
generating a first plurality of signals each having a frequency based on derived directly from a capacitive value due to a respective conductive member of the first plurality of conductive members, the at least one ground member, and at least one of an absence of the medium and a presence of the medium;
generating a signal enabling determination of the level of the medium based on frequencies of the first plurality of signals;
wherein the generating a signal enabling determination of the level of the medium comprises comparing changes in frequencies of two adjacent conductive members; and
wherein the comparing comprises determining a peak difference in change between frequencies of two adjacent conductive members.

48. The method of claim 47 further comprising generating a signal corresponding to a threshold level of the medium based on determining a peak difference in change in frequencies between two adjacent conductive members.

49. A method for detecting an object, the method comprising:
providing a first plurality of spaced-apart electrically conductive members disposed on a nonconductive support;
providing at least one ground member;
generating a first plurality of signals each having a frequency based on a capacitive value due to a respective conductive member of the first plurality of conductive members, an at least one ground member, and at least one of an absence of the object and a presence of the object;
generating a signal enabling detection of the object based on frequencies of the first plurality of signals; and
wherein the determining comprises providing a counter for determining the frequencies of the signals.

50. A method for detecting an object, the method comprising:
providing a first plurality of spaced-apart electrically conductive members disposed on a nonconductive support;
providing at least one ground member;
generating a first plurality of signals each having a frequency based on a capacitive value due to a respective conductive member of the first plurality of conductive members, an at least one ground member, and at least one of an absence of the object and a presence of the object;
generating a signal enabling detection of the object based on frequencies of the first plurality of signals; and
wherein the providing the first plurality conductive members comprising providing a first plurality of conductive members disposed horizontally on the nonconductive support.

* * * * *